Jan. 26, 1926.  
F. L. BISHOP  
1,570,822  
METHOD AND APPARATUS FOR ANNEALING AND COOLING SHEET GLASS  
Filed Sept. 4, 1924  2 Sheets-Sheet 1
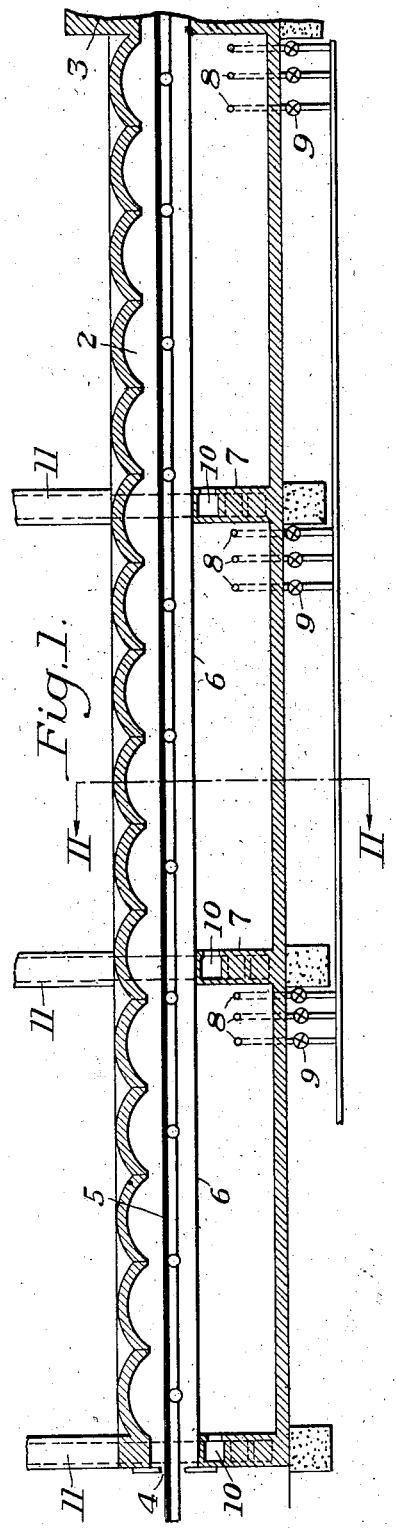
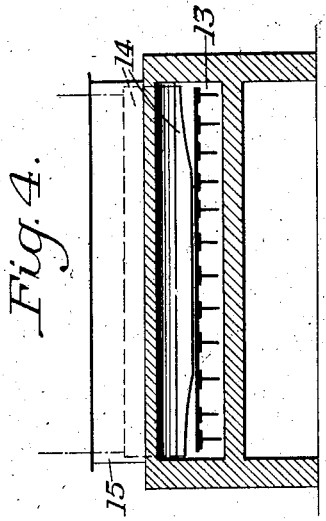
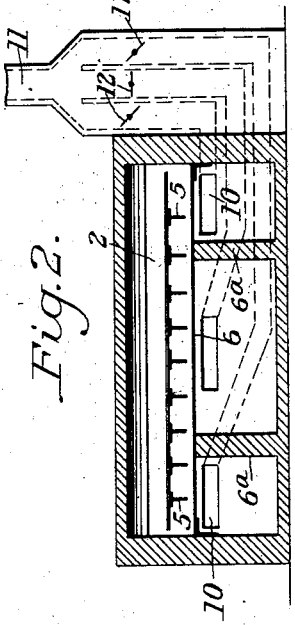
INVENTOR  
Frederic L. Bishop.

Jan. 26, 1926. 1,570,822
F. L. BISHOP
METHOD AND APPARATUS FOR ANNEALING AND COOLING SHEET GLASS
Filed Sept. 4, 1924   2 Sheets-Sheet 2
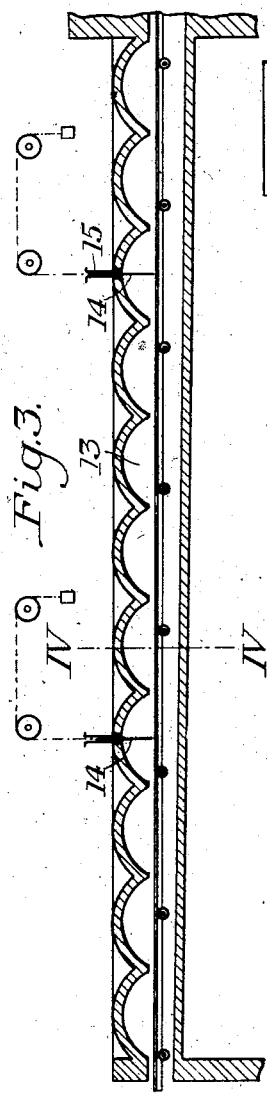
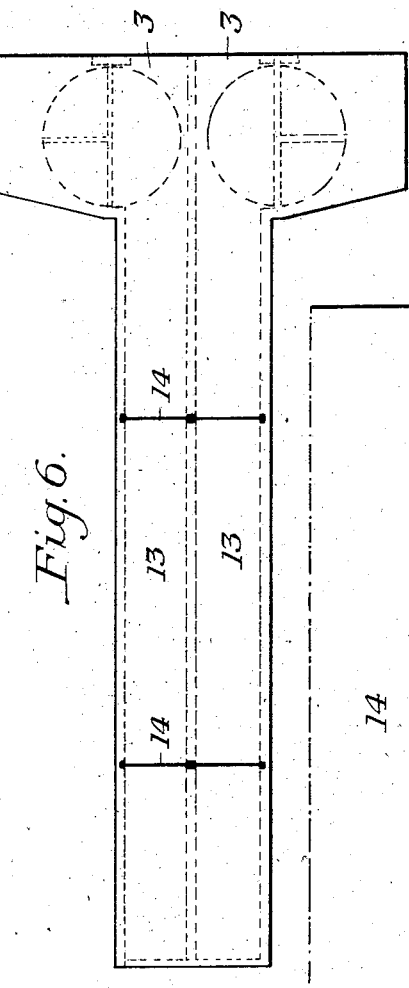
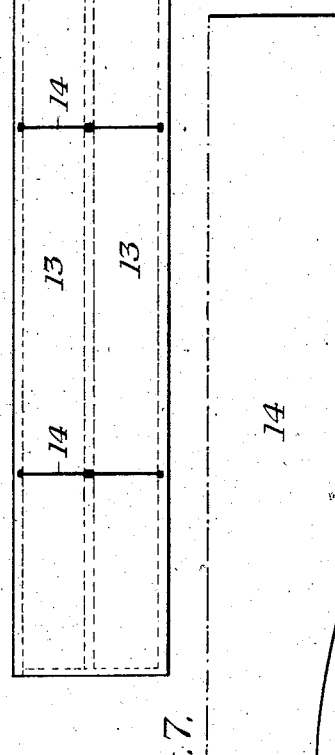
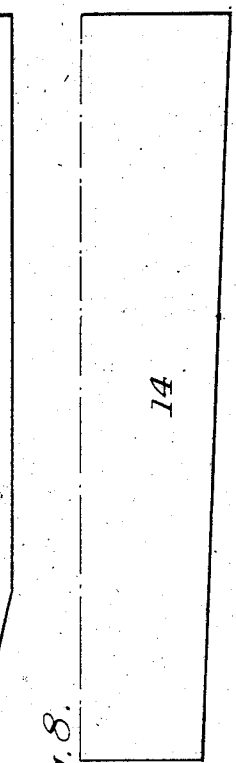
INVENTOR
Frederic L. Bishop.

Patented Jan. 26, 1926.

1,570,822

UNITED STATES PATENT OFFICE.

FREDERIC L. BISHOP, OF PITTSBURGH, PENNSYLVANIA, ASSIGNOR TO WINDOW GLASS MACHINE COMPANY, OF PITTSBURGH, PENNSYLVANIA, A CORPORATION OF NEW JERSEY.

METHOD AND APPARATUS FOR ANNEALING AND COOLING SHEET GLASS.

Application filed September 4, 1924. Serial No. 735,790.

*To all whom it may concern:*

Be it known that I, FREDERIC L. BISHOP, a citizen of the United States, residing at Pittsburgh, in the county of Allegheny and State of Pennsylvania, have invented a new and useful Improvement in Methods and Apparatus for Annealing and Cooling Sheet Glass, of which the following is a full, clear, and exact description.

This invention relates to a method and apparatus for annealing and cooling sheet glass, and is particularly directed toward a leer in which the temperature from side to side of the leer tunnel is more accurately controlled than heretofore.

In the co-pending application of John Hartzell, Serial No. 693,249, filed Feb. 16, 1924, there is shown an apparatus comprising a leer tunnel, means for passing glass therethrough, means for passing gaseous streams through the leer above and below the glass, and means for regulating the relative cooling effect of the two streams. In a leer tunnel of ordinary construction, the gas stream above the glass soon becomes much hotter than the stream below, and as a result the lower face cools more rapidly, so that the glass is warped when it is delivered from the leer tunnel.

The leer shown in the Hartzell application is effective for overcoming in a large measure the defects present in the ordinary leer. I have found, however, that it is desirable to effect a further regulation by providing means for transverse control of the temperature from side to side of the leer tunnel. This is of advantage in overcoming the general tendency of the gaseous stream to drop to a lower temperature adjacent the tunnel walls and is effective for providing gaseous streams of more nearly uniform temperature across the leer. This results in a more uniform annealing with a corresponding increase in the quality and uniformity of the product. In certain cases it may be desirable to effect a non-uniform condition across the leer and such result may be readily achieved by my invention.

The invention is useful for compensating for the individual characteristics of certain leers and insuring a uniform product therefrom. For example, it is common practice to build a pair of flattening ovens and connected leer tunnels, for use in connection with the cylinder process of making window glass, by providing a single division wall in the ovens and connected leers in the interest of economy in construction. This construction, however, is of disadvantage in certain cases, since an outer wall naturally radiates heat more readily and results in a non-uniform temperature condition across the leer. By my invention this defect is readily overcome.

This side to side temperature control may be accomplished in a variety of ways, as for example, by providing a heat transmitting floor for the tunnel, dividing the space under the tunnel into a plurality of chambers and separately regulating the heating of the various chambers. It may also be accomplished by the provision of dampers, such as shown in the Hartzell application above mentioned, and suitably shaping the bottoms of these dampers.

In the accompanying drawings illustrating the present preferred embodiment of my invention as applied to a flattening oven and connected leer for working on glass formed by the cylinder process—

Figure 1 is a vertical section through a flattening oven embodying my invention;

Figure 2 is a section on the line II—II of Figure 1;

Figure 3 is a vertical section through a flattening oven and connected leer tunnel, showing another form of my invention;

Figure 4 is a section on the line IV—IV of Figure 3;

Figure 5 is a view to an enlarged scale of a portion of Figure 4;

Figure 6 is a top plan view of a pair of ovens having a single division wall and showing an application of my invention thereto; and Figures 7 and 8 are views showing other forms of dampers which may be employed in connection with my invention.

In the embodiment of the invention illustrated in Figures 1 and 2, there is shown a horizontally extending leer tunnel 2 connected to a flattening oven indicated at 3. The oven 2 is heated in any desired manner and the heat from the oven passes through the leer 2 toward the delivery opening 4. Leer rods 5 of any suitable construction are placed in the leer tunnel 2 for supporting the glass as it travels therethrough, and when the leer is in operation, these rods are effective for supporting the glass sheets in such manner as to form a substantially continuous partition through the leer tunnel so that hot gases from the flattening oven 2 are divided into two streams, one above and one below the glass sheets.

The leer tunnel 2 is provided with a floor 6 of sheet metal or other suitable heat transmitting material and the space below this floor is divided into compartments by longitudinal partition walls 6ª and transverse partition walls 7. The partition walls divide the space below the floor into longitudinally extending chambers, each of which is heated as by gas burners 8, each having its individual regulating valve 9. Flues 10 are formed in the transverse partition walls 7 to provide an outlet for each of the chambers. These flues are all connected to the stacks 11 and are each provided with a damper 12 for supplementing the regulation of the valves 9. With this construction it is possible to heat the chambers in different amounts and by transmission through the floor 6 to vary the cooling effect of the lower gaseous stream in the leer. It will be understood that while the space under the floor of the tunnel is preferably divided into a number of compartments not only longitudinally but also laterally, the lateral partition walls may be omitted and a certain amount of regulation secured by dividing the space into chambers by the longitudinally extending walls 6ª alone.

In the above mentioned Hartzell application there is shown a form of apparatus wherein dampers are employed for diverting a portion of the heated gases from the upper to the lower stream. It has been found in practice that these dampers are exceedingly effective for varying the relative cooling effect of the two streams and thus securing the desired equalization of the cooling rate from the two surfaces of the sheet glass.

My invention may be readily applied to this form of leer as shown, for example, in Figures 3 to 5 inclusive, by suitably shaping the lower portion of the dampers. In the embodiment of my invention illustrated in Figures 3 to 5, there is shown a leer tunnel 13 having dampers 14 provided therein. These dampers are vertically adjustable and serve to divert a portion of the gases from the upper stream to the lower stream. As shown in Figures 4 and 5, I suitably shape the bottom portion of the damper to provide for regulation laterally of the gaseous stream. It will be noted that the damper extends further down in the center than at the edges, so that the upper stream is partially choked back or retarded in the center portion, and is permitted freer passage adjacent the walls of the leer. This offsets the natural cooling effect of the walls of the gaseous stream and tends toward a greater uniformity of temperature across the leer.

As indicated by dotted lines in Figure 5, the vertical position of the damper 14 may be regulated and where such regulation is carried to a point where a portion only of the damper projects into the leer tunnel from the casing 15 in which it is housed, the effect is to give full passage for the gases at the edge portions and to restrict the flow only partially in the center. The position of the damper may be regulated as desired to meet existing conditions.

Figure 6 shows in top plan view a pair of flattening ovens and connected leer tunnels as frequently constructed in window glass plants. It will be seen that when both ovens are running the cooling effect of one wall for each tunnel is entirely lost with the result that there is a general tendency toward increased temperature on the side of the leer adjacent the inner partition wall. In fact, the cooling effect of the division wall is largely lost even though one oven is unheated. If the embodiment of my invention shown in Figures 1 and 2 is applied to such a leer construction, this may be readily offset by adjusting the burners 8. Where the embodiment of the invention shown in Figures 3 to 5 is employed, however, it is desirable to shape the dampers as shown in Figure 7 or Figure 8, wherein the gaseous stream is choked back more on the partition side than on the other, depending on the width of the leer and on the manner in which heat is supplied thereto. The bottom of the damper may be shaped as shown in either figure or may be otherwise embodied as desired.

It will thus be seen that I provide for varying the cooling effect of the gases as they pass through the leer tunnel laterally of the tunnel and compensate not only for the special characteristics of particular leers but also overcome the general non-uniform temperature effect which will be found in any leer. By my invention a desired uniform temperature condition or a desired non-uniform temperature condition from side to side of the leer may be readily obtained. It will be understood that either form of the invention may be used separately or they may be combined if a closer control is desired. Other means of regulating the cooling effect from side to side of the leer may be employed, as for example, by a plurality of water coolers separately controlled, for while I have shown the preferred embodiments of my invention, it is not limited to the illustrated forms, but may be otherwise embodied within the scope of the following claims.

I claim:

1. In the method of annealing and cooling sheet glass, the steps consisting in passing glass through a leer, passing streams of heated gaseous fluid through the leer above and below the glass and in contact therewith, and varying the cooling effect of at least one of said streams from side to side of the leer.

2. Apparatus for annealing and cooling sheet glass, including a leer, means for passing sheet glass therethrough, the leer being adapted for the passage of streams of heated gaseous fluid through the leer above and below the glass and in contact therewith, and means for varying the cooling effect of at least one of such streams laterally of such stream.

3. Apparatus for annealing and cooling sheet glass including a leer, means for passing sheet glass therethrough, means whereby gaseous fluid is supplied to the leer, and a damper across the leer for regulating the flow of gaseous fluid therethrough, the damper being shaped to provide a varying obstruction from side to side of the leer.

4. Apparatus for annealing and cooling sheet glass including a plurality of leers divided one from another by a common wall, means for passing sheet glass through the several leers, means whereby gaseous fluid is supplied to the several leers, and dampers across the several leers for regulating the flow of gaseous fluid therethrough, the dampers being shaped to provide a varying obstruction from side to side of the several leers.

In testimony whereof I have hereunto set my hand.

FREDERIC L. BISHOP.